United States Patent [19]

Asao et al.

[11] Patent Number: 4,561,100
[45] Date of Patent: Dec. 24, 1985

[54] DIGITAL SIGNAL RECEIVER

[75] Inventors: Motoaki Asao, Daito; Hideaki Nanko, Nishinomiya, both of Japan

[73] Assignee: Sanyo Electric Co., Ltd., Osaka, Japan

[21] Appl. No.: 640,244

[22] Filed: Aug. 13, 1984

Related U.S. Application Data

[63] Continuation of Ser. No. 340,656, Jan. 19, 1982, abandoned.

[30] Foreign Application Priority Data

Jan. 20, 1981 [JP] Japan ................................. 56-7448
Jan. 21, 1981 [JP] Japan ................................. 56-8276

[51] Int. Cl.⁴ .......................................... H03D 1/04
[52] U.S. Cl. ..................................... 375/99; 358/337; 375/118
[58] Field of Search .................. 375/13, 111, 118, 99; 370/100, 108; 371/41, 47, 49, 61, 62, 68; 358/147, 166, 337

[56] References Cited

U.S. PATENT DOCUMENTS

| | | | |
|---|---|---|---|
| 3,660,761 | 5/1972 | Harmon, Jr. et al. | 375/13 |
| 3,705,315 | 12/1972 | Clark | 375/111 X |
| 3,715,665 | 2/1973 | Chang | 375/13 |
| 3,746,800 | 7/1973 | Stuart | 375/111 X |
| 3,935,535 | 1/1976 | Motley et al. | 375/13 |
| 4,097,806 | 6/1978 | Evans | 375/13 |
| 4,263,672 | 4/1981 | Deman | 375/111 |
| 4,271,520 | 6/1981 | Coombes et al. | 371/47 X |
| 4,365,329 | 12/1982 | Sauvanet | 375/111 X |
| 4,430,743 | 2/1984 | Watanabe | 375/13 |

OTHER PUBLICATIONS

William D. Stanley, *Electronic Communications Systems*, Reston Publishing Company, Inc., 1982, pp. 100–105.

Primary Examiner—Robert L. Griffin
Assistant Examiner—Stephen Chin
Attorney, Agent, or Firm—Armstrong, Nikaido, Marmelstein & Kubovcik

[57] ABSTRACT

A digital signal receiver is structured to receive and demodulate a digital signal. Such digital signal may comprise, for example, a television signal of character multiplex transmission having a digital signal included in the vertical blanking period of the television signal and a digital signal receiver may be structured to reproduced the digital signal from the television signal. The digital signal includes a clock run-in signal (CRI), a framing code signal (FRC) and a bit serial data signal (DA) disposed in succession. An error of the framing code or the data signal caused by a low frequency region group delay characteristic of a transmission path between the transmission and the demodulation is detected based on the digital signal. Upon detection of an error, a waveform distortion of the framing code signal and the data signal is corrected by means of a correcting circuit (15) such as an LC circuit, whereby an error of the data signal to be demodulated thereafter is prevented.

6 Claims, 19 Drawing Figures

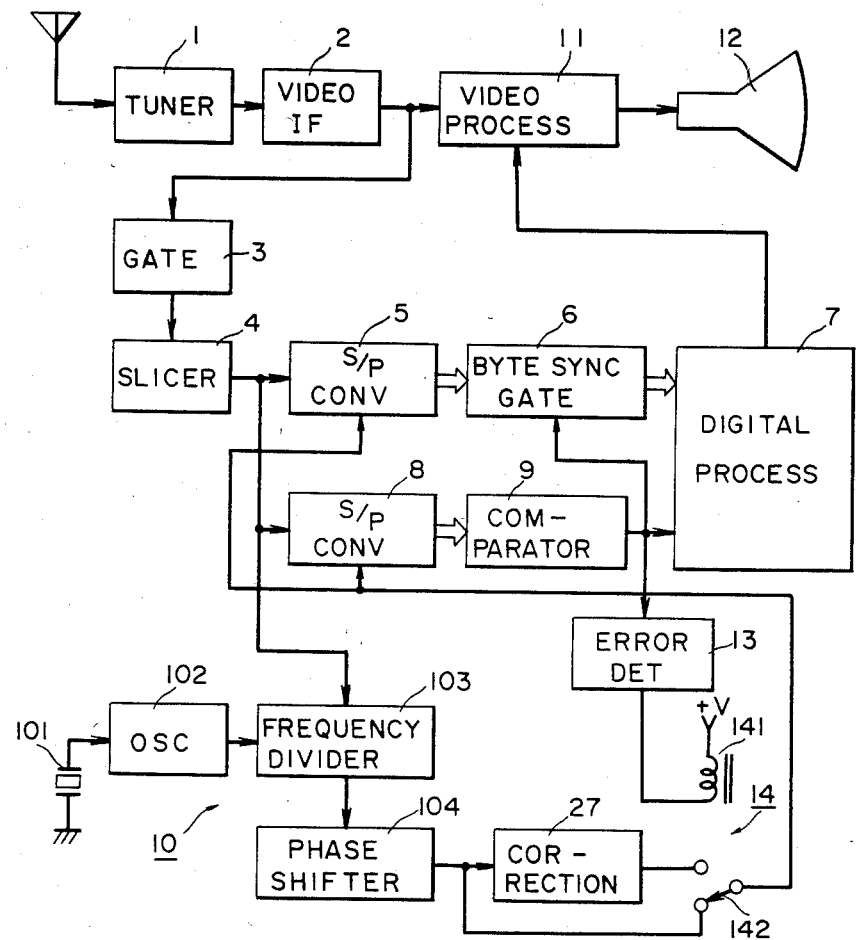

DIGITAL SIGNAL RECEIVER

This application is a continuation of application Ser. No. 340,656, filed 1/19/82, now abandoned.

BACKGROUND OF THE INVENTION

1. Field of the Invention

The present invention relates to a digital signal receiver. More specifically, the present invention relates to a digital signal receiver such as a teletext receiver adapted for displaying characters on a screen by extracting a digital signal including a clock run-in signal, a framing code signal and a data signal inserted in the vertical blanking period of a television signal of character multiplex transmission.

2. Description of the Prior Art

Character multiplex broadcasting has been proposed as a digital signal transmission system for use with television receivers. Such system is adapted such that a digital signal representing data such as characters and figures is inserted in an appropriate period of one to several horizontal scanning periods during a vertical blanking period of a television broadcasting signal so that the digital signal may be transmitted.

A receiver adapted for receiving such television character multiplex broadcasting is described in detail in an article entitled "Teletext Receiver and Test Signal Generating Apparatus" contributed by Mr. Kuroda et al. in Sanyo Technical Review, Vol. 11, No. 1, 1979. The above referenced article describes the rating of such teletext signal and an outline of a receiver. Another article entitled "Consumer Text Display Systems" contributed by Brian Harden in IEEE Transactions on Consumer Electronics, July, 1979, Vol. CE 25 also describes an overall structure of a teletext system.

FIG. 1 is a view showing a structure of a television character multiplex signal, representing one horizontal scanning period of the 20th horizontal scanning period during the vertical blanking period where a digital character signal (data) is inserted. More specifically, a digital signal is inserted in one horizontal scanning period of the 20th period during the vertical blanking period. The digital signal includes a clock run-in signal, a framing code signal and a data signal. The clock run-in signal starts a predetermined time period after a color burst signal (CG) positioned at the back porch of a horizontal synchronizing signal (HS) and includes a repetition of the logics one and zero. The framing code signal includes an 8-bits signal following the clock run-in signal and the data signal lasts from the next bit of the framing code signal to the end of the above described one horizontal scanning period.

The above described data signal (DA) includes a bit serial code signal covering 8-bits as one word. The above described clock run-in signal is structured as a signal of 16 or 18 bits including a repetition of the logics one and zero as described previously and is used as a time reference in generating a sampling clock signal for extracting the above described data signal (DA) in a television receiver. The above described framing code signal comprises a specified code signal of 8-bits selected to achieve proper synchronization even upon occurrence of a data error of one bit and is used as a time reference in conversion from serial to parallel on an 8-bit by 8-bit basis of the data signal extracted through sampling. Since the framing code signal includes a number of utilizable code structure any suitable one may be employed. For example, the C55 system of NHK in Japan adopts "11100101" and the Teletext system in United Kingdom "11100100" and the Antiope system in France adopts "11100111".

FIG. 2 is a block diagram showing of a conventional digital signal receiver for receiving a character multiplex broadcasting signal and FIG. 3 is a graph showing an overall group delay characteristic of a transmission path between a transmitter and a receiver.

Now referring to FIG. 2, a structure and an operation of a conventional digital signal receiver. A television signal transmitted from a transmitter end, not shown, is applied through an antenna to a tuner 1. The tuner 1 is selectively tuned to a desired television signal and the desired television signal is converted into a video intermediate frequency signal. The video intermediate frequency signal from the tuner 1 is applied to a video intermediate frequency circuit 2. Although not shown, the video intermediate frequency circuit 2 comprises a video amplifier, a video detecting circuit and the like and provides a video signal. The video signal from the video intermediate frequency circuit 2 is applied to a video processing circuit 11 and a gate circuit 3. The gate circuit 3 serves to extract from the video signal one horizontal scanning period portion of the character multiplex signal as inserted. The output signal from the gate circuit 3 is applied to a slicer circuit 4. The slicer circuit 4 serves to slice the output signal from the gate circuit, thereby to convert the same into a rectangular waveform for the purpose of providing a binary signal. The output signal from the slicer circuit 4 is applied to serial/parallel converting circuits 5 and 8 and a frequency dividing circuit 103 included in a sampling clock generating circuit 10. The sampling clock generating circuit 10 serves to generate a sampling clock signal in synchronism with a clock run-in signal included in the output signal from the slicer circuit 4 and comprises a quartz oscillator 101, an oscillating circuit 102, a frequency dividing circuit 103 and a phase shifting circuit 104. The oscillating circuit 102 is for making oscillation of a signal of say 28 MHz and the frequency dividing circuit 103 serves to frequency divide by 1/5 the oscillation output signal from the oscillating circuit 102 in synchronism with the output signal from the slicer circuit 4. The frequency divided output signal from the frequency dividing circuit 103 is applied to the phase shifting circuit 104 as a sampling clock signal. The phase shifting circuit 104 is produced for adjusting the phase of the sampling clock signal. The sampling clock signal thus generated is applied to the above described serial/parallel converting circuits 5 and 8.

The serial/parallel converting circuit 8 serves to convert the framing code signal of 8 bits into a parallel signal, which is then applied to a comparator 9. The comparator 9 determines coincidence of the preset code signal obtained from a memory stored with the framing code signal obtained from the serial/parallel converting circuit 8, thereby to provide a timing pulse upon coincidence of both, which is applied to a byte synchronization gate circuit 6 and a digital processing circuit 7.

The above described serial/parallel converting circuit 5 includes a shift register and is responsive to the sampling clock signal from the above described sampling clock generating circuit 10 to extract the data signal on an 8-bit by 8-bit basis from the output signal of the slicer circuit 4 by sampling the same, whereby the data signal of 8 bits, i.e. one byte as extracted is converted into a parallel signal. The data signal as converted into the parallel signal by the serial/parallel converting circuit 5 is byte synchronized for every 8 bits by the byte synchronizing gate circuit 6 as a function of the timing pulse obtained from the comparator 9. The data signal as byte synchronized is applied to the digital processing circuit 7. The digital processing circuit 7 comprises a microcomputer, for example, and digitally processes the data signal of 8 bits (one byte) so that the same is displayed on a proper position on the television screen. The digital processing circuit 7 is more fully described in the previously described two articles. The data signal as processed by the digital processing circuit 7 is applied to the video processing circuit 11. The video processing circuit 11 serves to superimpose the data serving as a character signal as processed by the digital processing circuit 7 on to the television video signal obtained from the video intermediate frequency circuit 2 and provides the same to a picture tube 12.

A conventional digital signal receiver is generally structured as described above. A point to be noted in connection with the present invention is an overall group delay characteristic of a transmission path from a modulator on the part of a transmitting station through the tuner 1 to the output point A of the video intermediate frequency circuit 2 in the receiver. More specifically, generally a television receiver is adapted such that the group delay characteristic from the tuner 1 through the video intermediate frequency circuit 2 may be offset by the group delay characteristic on the part of the transmitter. However, this is true only with respect to a wide range component (3 to 4 MHz band) in the video signal range and no particular consideration has not been necessarily given to the low frequency range portion (0 to 2 MHz band) in the video signal range. Accordingly, the low frequency range portion of the group delay characteristic at the point A in FIG. 2, i.e. the overall group delay characteristic of the transmission path including the transmitter and the receiver (the low frequency range group delay characteristic) could be flat as shown as (A) in FIG. 3, could be slanted as shown as (B) in FIG. 3 meaning a lagged phase, or could be slanted as shown as (C) in FIG. 3, meaning an advanced phase, depending on the cases. This is determined by the respective group delay characteristics of the transmission path from the modulator on the part of the transmitter and the tuner 1 through the video intermediate frequency circuit 2 in the receiver.

Meanwhile, the above described bit rate of the character multiplex signal is selected to be 5.73 Mbits/second in the case of the preferably described C55 system of NHK, for example. Therefore, in the case of a repetition of the logics one and zero for each bit such as in the previously described clock run-in signal, the repetition frequency comes to correspond to a half of the bit rate, i.e. approximately 2.86 MHz. This means that the clock run-in signal is little influenced by the lower frequency range portion (0 to 2 MHz frequency range) of the group delay characteristic shown in FIG. 3.

On the other hand, the bit rate of the framing code signal in the character multiplex signal is also 5.73 Mbits/second as a matter of course. However, the framing code signal is not a signal of periodical repetition for each bit as described previously. This means that the framing code signal includes a frequency component relatively low, i.e. lower than 2 MHz. Accordingly, the framing code signal is influenced by the low frequency region group delay characteristic shown as (B) or (C) in FIG. 3, thereby to cause a waveform distortion and a phase distortion. Therefore, the framing code signal can not be properly sampled in the serial/parallel converting circuit 5 and the comparator 9 shown in FIG. 2 cannot detect coincidence of the predetermined code signal and the framing code signal and hence a problem is involved that an error is caused in achieving byte synchronization of the data signal.

More specifically, when a waveform distortion is caused in the framing code signal, the level of the distorted portion which was to be determined as the logic one decreases and that portion is determined as the logic zero in the slicer circuit 4 and hence is not sliced. Therefore, according to a conventional digital signal receiver, when the framing code signal is sampled in the serial/parallel converting circuit 8 as a function of the sampling clock signal, an error is caused in the first bit or the final bit out of three bits which must originally assume the high level consecutively at the beginning of the framing code signal, with the result that the framing code cannot be detected. Furthermore, when a phase distortion is caused in the framing code signal, the phase could be lagged or advanced. However, since the clock run-in signal is little influenced by the low frequency range group delay characteristic of the transmission path, no change occurs in the phase of the sampling clock signal being generated in synchronism with the clock run-in signal. This means that the phase of the framing code signal with respect to the sampling clock signal changes. More specifically, the sampling time of the framing code signal being sampled with the sampling clock signal deviates, with the result that an erroneous framing code signal is detected and a normal framing code signal is not detected. This causes an error not only in connection with the framing code signal but also in connection with the data when the succeeding data signal is sampled.

SUMMARY OF THE INVENTION

A digital signal receiver in accordance with the present invention is adapted such that a digital signal including a data signal and a specified code signal disposed preceding the data signal is received and is demodulated by a demodulating means and upon receipt of the demodulated digital signal an error caused by a low frequency region group delay characteristic of a transmission path between the transmission and the demodulating means with respect to at least one of the demodulated specified code signal and the demodulated data signal is detected. At least one of a succeeding demodulated digital signal and a signal for reproduction of the data signal is corrected responsive to the above described error detection. Therefore, according to the present invention, the data signal can be properly reproduced from the demodulated digital signal without being influenced by the low frequency region group delay characteristic.

In a preferred embodiment of the present invention, for the purpose of detecting an error caused by the low frequency region group delay characteristic of the transmission path, comparison is made of the demodulated code signal and a predetermined code signal, thereby to determine coincidence or non-coincidence of both. In another embodiment of the present invention, an error caused by the group delay characteristic of the transmission path is detected by detecting the peak value of the demodulated digital signal. An error caused by the group delay characteristic of the transmission path can also be detected by detecting whether an error has arisen in the data signal by making parity check of the demodulated data signal. Error detection by such parity check can be readily performed by a conventionally known parity check circuit.

An LC circuit is utilized for correcting the demodulated digital signal. By utilizing such LC circuit, a waveform distortion caused by the low frequency region group delay characteristic of the transmission path can be corrected. More specifically, by correcting the waveform distortion, the margin of the digital signal in the amplitude direction with respect to the slice level can be increased in slicing the digital signal, whereby the signal component which is to be determined as the logic one is prevented from being determined as the logic zero, for example. On the other hand, since the LC circuit has a phase shifting function, a phase distortion caused by the low frequency region group delay characteristic of the transmission path can also be improved. More specifically, by improving the phase distortion, it is possible to make the sampling timing of the digital signal consistent with the sampling clock signal in sampling the digital signal with the sampling clock signal.

Accordingly, a principal object of the present invention is to provide a digital signal receiver which is capable for properly reproducing a data signal without being influenced by a group delay characteristic of the transmission path.

One aspect of the present invention resides in proper reproduction of a data signal by eliminating an influence caused by the group delay characteristic of the transmission path by enhancing the margin between the slice level and the amplitude of the digital signal in slicing a demodulated digital signal.

Another aspect of the present invention resides in proper reproduction of a data signal by decreasing an influence caused by a group delay characteristic of the transmission path by making the sampling timing of the digital signal consistent with the phase of the sampling clock signal in sampling a data component of the demodulated digital signal with the sampling clock signal.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 16 is a block diagram of still a further embodiment of the present invention;

DESCRIPTION OF THE PREFERRED EMBODIMENTS

Figure 4:
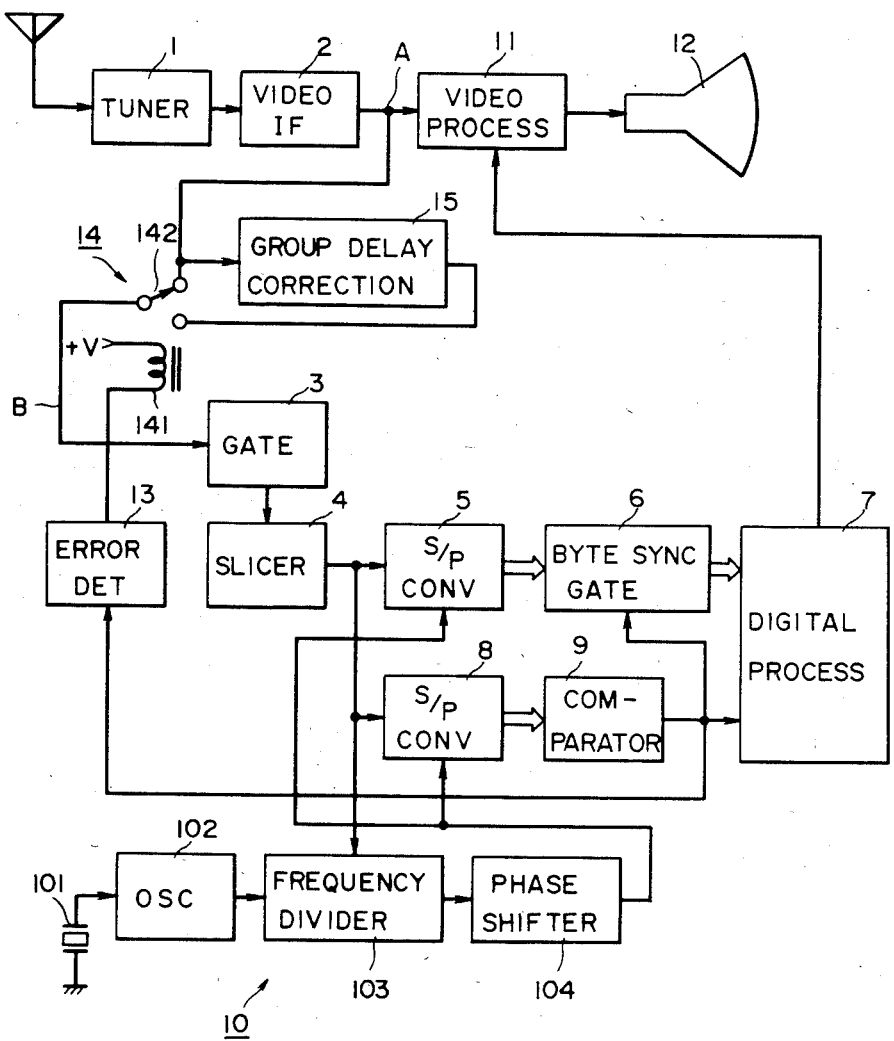
FIG. 4 is a block diagram of one embodiment of the present invention.
Figure 5:
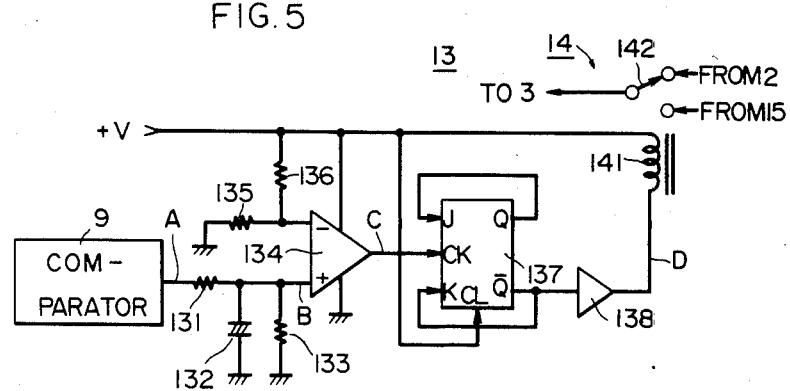
FIG. 5 is a block diagram showing in detail an error detecting circuit shown in FIG. 4.

FIG. 4 is a block diagram of one embodiment of the present invention and FIG. 5 is a view showing in detail an error detecting circuit 13 shown in FIG. 4.

Figure 1:
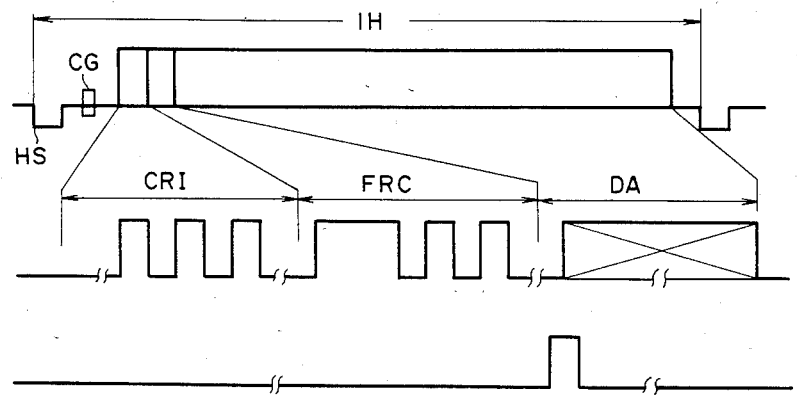
FIG. 1 is a view showing a structure of a television character multiplex signal.

First referring to FIG. 4, a structure of one embodiment of the present invention will be described. The FIG. 4 embodiment is characterized by additional provision of circuit blocks set forth in the following in addition to the FIG. 1 digital signal receiver. More specifically, between the video intermediate frequency circuit 2 and the digital signal character extracting gate circuit 3 is selectively connected through a contact 142 of a relay 14 a group delay correcting circuit 15 implemented by an LC circuit, for example. The above described relay 14 is controlled by an error detecting circuit 13 for detecting the presence or absence of the framing code signal detected pulse obtained from the comparator 9.

Figure 3:
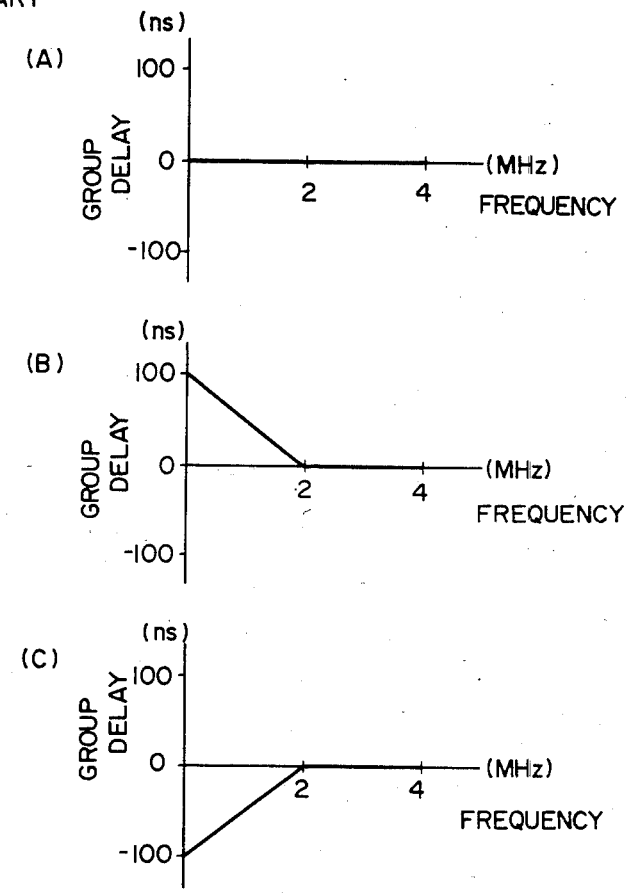
FIG. 3 is a graph showing an overall group delay characteristic of the transmission path between transmitter end and the receiver end.

The above described group delay correcting circuit 15 is provided for the purpose of correcting an inclination (an advanced phased or a lagged phase) of the overall low frequency region group delay characteristic of the transmission path at the point A in FIG. 4 and the same is provided to be selectively connected for the following reason. More specifically, as described previously, even if the low frequency group delay characteristic of the transmission path in the tuner 1 and the video intermediate frequency circuit 2 in the receiver is uniform for each channel of the character multiplex broadcasting, the overall frequency region group delay characteristic of the transmission path at the point A could be flat as shown as (A) in FIG. 3 for one channel and could be inclined (a lagged phase characteristic) as shown as (B) in FIG. 3 for another channel, if and when the low frequency region group delay characteristic of a modulator on the part of a transmitting station is different from each channel. Accordingly, when a channel having a lagged phase group delay characteristic of the transmission path is received, it is necessary to make flat or fully easy the inclination of the overall low frequency region group delay characteristic of the transmission path at the point B in FIG. 4. To that end, in the case where two broadcasting channels having the low frequency region group delay characteristics of the transmission path at the point A as shown as (A) and (B) in FIG. 3 are intended, the above described group delay correcting circuit 15 should be preferably structured as one kind of a phase shifting circuit exhibiting an opposite characteristic to (B) in FIG. 3, i.e. exhibiting the characteristic shown as (C) in FIG. 3.

On the other hand, the above described error detecting circuit 13 comprises a comparator 134, a flip-flop 137 and a relay drivers circuit 138, as shown in FIG. 5. The comparator 134 is provided for determining whether a framing code signal detected pulse is obtained from the comparator 9. One input terminal of the comparator 134 is supplied with an integrated signal by integrating the framing code signal detected pulse from the comparator 9 by means of resistors 131 and 133 and a capacitor 132. The other input terminal of the comparator 134 is supplied with, as a reference voltage, a constant voltage obtained by voltage dividing the source voltage +V by means of voltage dividing resistors 135 and 136. The comparator 134 provides the output signal to the flip-flop 137 when the framing code signal detected pulse exceeds the reference voltage. The flip-flop 137 may comprise a JK flip-flop, for example, which is triggered with the output signal of the comparator 134, thereby to provide the output signal of the low level to the relay driver circuit 138. Accordingly, the relay driver circuit 138 drives a coil 141 of the relay 14.

Figure 6:
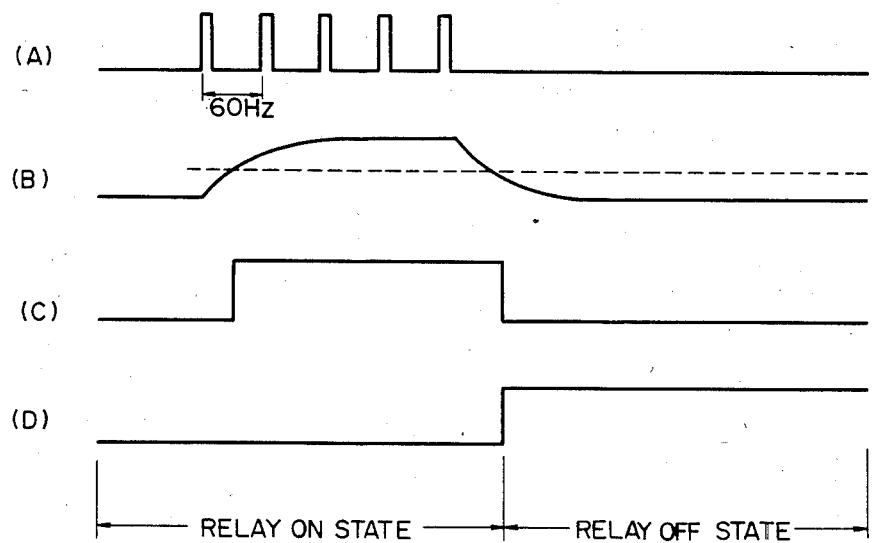
FIG. 6 is a graph showing the waveforms at the various portions in the FIG. 5 diagram.

FIG. 6 is a graph showing the waveforms at various portions in the FIG. 5 diagram.

Now referring to FIGS. 3 to 6, a specific operation of one embodiment of the present invention will be described. The framing code signal detected pulse is obtained one by one upon each detection of the framing code signal by the comparator 5 shown in FIG. 4 (see FIG. 1). Accordingly, in the case where the framing code signal has been normally detected without any waveform distortion, i.e. in a reception state of a channel where the low frequency region group delay characteristic of the transmission path at the point A is as shown as (A) in FIG. 3, the framing code detected pulse comprises a pulse train signal including a succession of the pulses of the repetition frequency of 60 Hz. The reason is that the television character multiplex system has been adapted such that character signals are transmitted during each vertical blanking period having a period of 1/60 second, as described previously.

However, in a reception state of a channel where the low frequency region group delay characteristic of the transmission path at the point A in FIG. 4 is of a lagged phase characteristic as shown as (B) in FIG. 3, the framing code signal undergoes waveform distortion as described previously, whereby the same is not correctly detected. Therefore, the framing code detected pulse is not obtained as shown as (A) in FIG. 6. Then, the comparator 134 of the error detecting circuit 13 in FIG. 5 provides a low level signal to the flip-flop 137. Then the Q output of the flip-flop 137 becomes the high level and no current comes to flow through the coil 141 of the relay 14. Therefore, the contact 142 of the relay 14 is turned to the output side of the group delay correcting circuit 15 and as a result the group delay correcting circuit 15 comes to be inserted between the video intermediate frequency circuit 2 and the gate circuit 3. Accordingly, the inclination of the overall low frequency region group delay characteristic at the output point B of the group delay correcting circuit 15 becomes flat or sufficiently easy. Therefore, as far as the point B is concerned, the waveform distortion of the framing code signal is improved and accordingly a detecting operation of the framing code signal is performed correctly.

More specifically, if and when waveform distortion has a risen in the framing code signal due to the group delay characteristic of the transmission path, the amplitude of the signal component which is to be determined as the logic one in the framing code signal becomes small as compared with the slice level of the slicer circuit 4 and therefore the above described signal component is determined as the logic zero, with the result that it could happen that the framing code signal can not be sliced and hence the framing code signal can not be properly detected. However, according to the embodiment shown, waveform distortion of the framing code signal is corrected by the group delay correcting circuit 15 and as a result the amplitude margin of the framing code signal with respect to the slice level can be made large. As a result, an error can be prevented in which the signal component of the logic one in the framing code signal is not sliced due to waveform distortion caused by the low frequency region group delay characteristic of the transmission path.

Furthermore, according to the embodiment shown of the present invention, phase distortion caused by the group delay characteristic of the transmission path can also be improved. More specifically, the data signal is sampled by means of the serial/parallel converting circuit 5 shown in FIG. 4 as a function of the sampling clock signal obtained from the sampling clock generating circuit 10. However, the framing code signal and the data signal undergoes phase distortion to the group delay characteristic of the transmission path. Therefore, the sampling timing of the framing code signal and the data signal when the framing code signal and the data signal are sampled as a function of the sampling clock signal also deviates, with the result that the data is not normally sampled, whereby an error is caused. However, according to the embodiment shown, since the phase distortion of the framing code signal and the data signal are also corrected by the group delay correcting circuit 15, the sampling timing of the framing code signal and the data signal as a function of the sampling clock signal is also improved, whereby an error is prevented from occurring due to the fact that the forming code signal and the data signal is not sampled.

Figure 7:
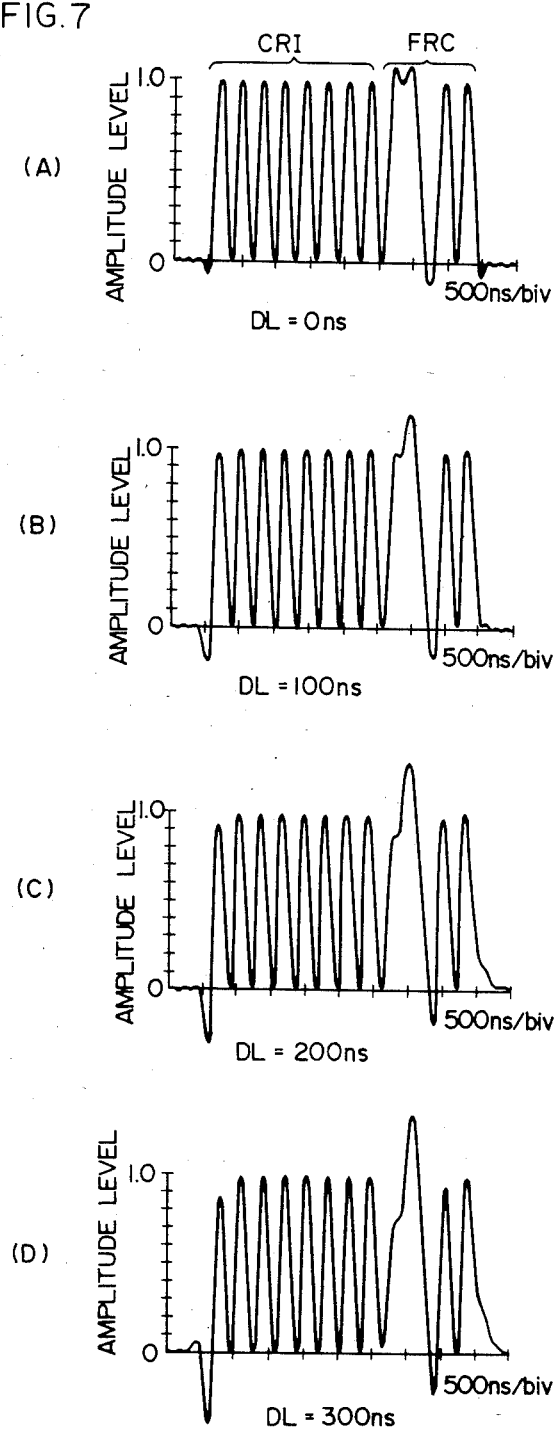
FIG. 7 is a graph showing waveforms of the clock run-in signal and the framing code signal detected in a digital receiver.
Figure 8:
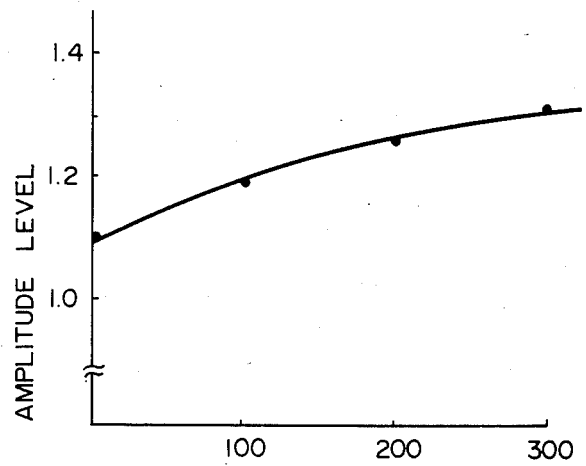
FIG. 8 is a graph showing a relation between the low frequency region group delay amount and the amplitude of the framing code signal.
Figure 9:
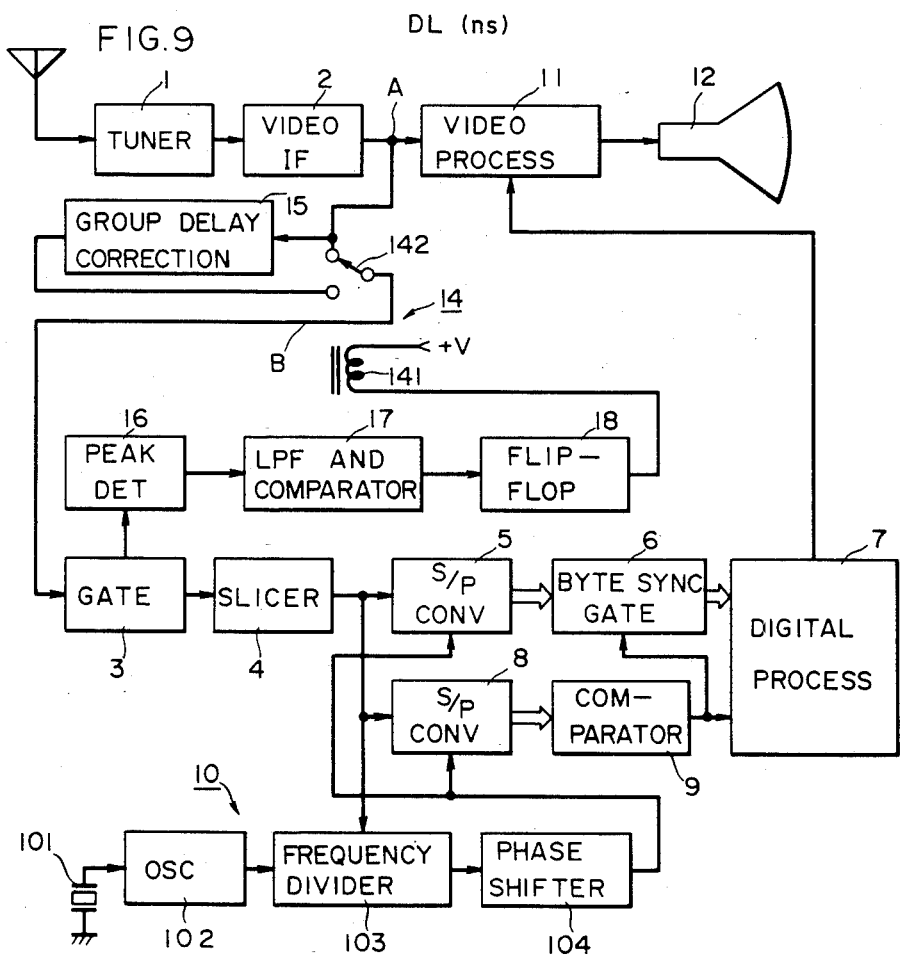
FIG. 9 is a block diagram of another embodiment of the present invention.

FIG. 7 is a graph showing waveforms of the clock run-in signal and the framing code signal detected in the digital receiver, FIG. 8 is a graph showing the relation between the low frequency region group delay amount and the amplitude of the framing code signal, and FIG. 9 is a block diagram of another embodiment of the present invention.

The embodiment shown is adapted to correct the overall group delay characteristic upon detecting the peak value of the framing code signal based on an influence caused by the low frequency region group delay characteristic of the transmission path. More specifically, a character broadcasting channel of a relatively large low frequency region group delay amount is received, a positive peak level of the forming code signal becomes high as shown as (A) to (D) in FIG. 7 and in addition the larger the group delay amount the higher the peak level. Therefore, in the embodiment shown the previously described error detecting circuit 13 shown in FIG. 4 is replaced by a peak detecting circuit 16, a low-pass filter, a comparator 17 and a flip-flop 18 for the purpose of detecting the positive peak level of the framing code signal.

Figure 10:
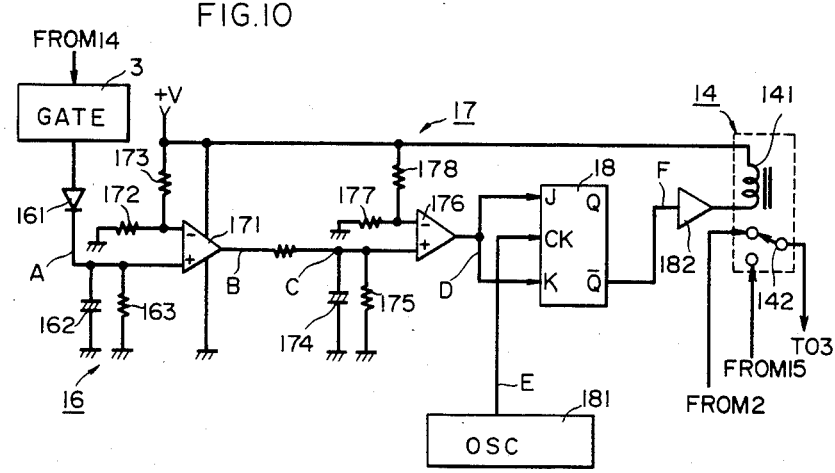
FIG. 10 is a block diagram showing the peak detector, the low-pass filter, the comparator and the flip-flop in FIG. 9.
Figure 11:
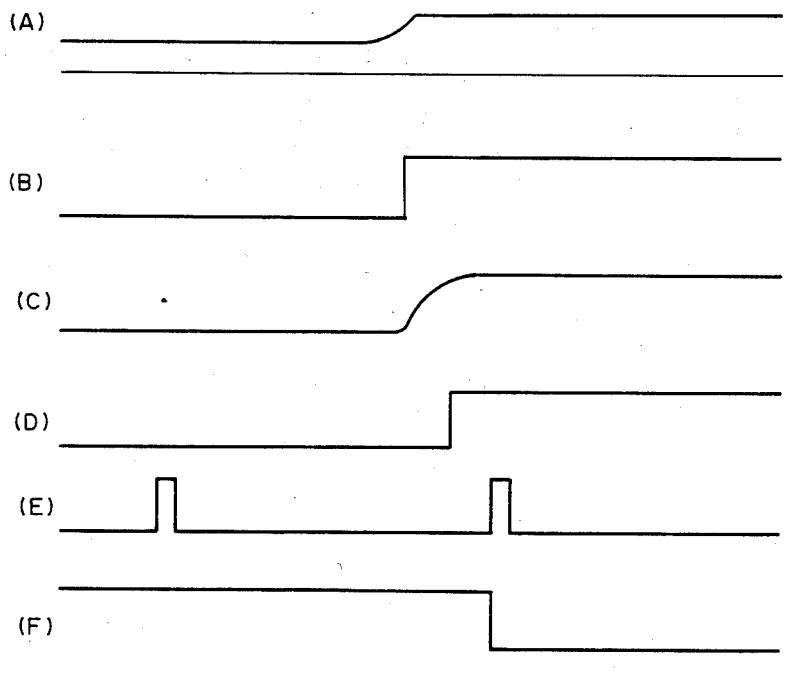
FIG. 11 is a graph showing the waveforms at the various portions in the FIG. 10 diagram.

FIG. 10 is a diagram showing in detail the peak detecting circuit 16, the low-pass filter, the comparator 17 and the flip-flop 18 shown in FIG. 9 and FIG. 11 is a graph showing waveforms at various portions in the FIG. 10 diagram.

Now referring to FIG. 10, the peak detecting circuit 16 comprises a reverse flow preventing diode 161 coupled to the output of the gate circuit 3, a capacitor 162 for maintaining the peak value, and a resistor 163 parallelly coupled to the capacitor 162. The output terminal of the peak detecting circuit 16 is connected to one input terminal of the comparator 171. The other input terminal of the comparator 171 is supplied with a reference voltage obtained by voltage dividing the source voltage +V by means of voltage dividing resistors 172 and 173. The output terminal of the comparator 171 is connected to the capacitor 174 and the resistor 175 constituting a low-pass filter and is also connected to one input terminal of a comparator 176 at the succeeding stage. The other input terminal of the comparator 176 is supplied with a reference voltage obtained by voltage dividing the source voltage +V by means of voltage dividing resistors 177 and 178. Thus, the comparators 171 and 176 are cascade connected with the capacitor 174 and the resistor 175 constituting a low-pass filter therebetween for the purpose of supplementing the time constant of the above described peak detecting circuit 16.

The output terminal of the above described comparator 176 is connected to the J and K input terminals of a JK flip-flop 18 serving. The clock input terminal of the flip-flop 18 is supplied with a low frequency clock signal of the frequency of say several Hz to several tens Hz from a low frequency oscillator 181. The low frequency oscillator 181 serves as a clock signal source of flip-flop 18. Furthermore, the $\bar{Q}$ output terminal of the flip-flop 18 is connected to a relay driver circuit 182. The relay driver circuit 182 is provided for the purpose of driving a coil 141 of a relay 14.

Now referring to FIGS. 7 to 11, a specific operation of the embodiment shown will be described. In the state where no character multiplex broadcasting signal is received, no digital signal is obtained from the gate circuit 3 and therefore the output of the peak detecting circuit 16 is the low level. Therefore, the respective output terminals of the comparators 171 and 176 are also the low level. When the clock signal is applied from the low frequency oscillator 181 to the flip-flop 18, the $\bar{Q}$ output of the flip-flop becomes the high level. Therefore, the relay 14 is not driven and the contact 142 thereof is turned to the output side of the intermediate frequency circuit 2, as shown in FIG. 9, and accordingly the group delay correcting circuit 15 is not connected between the video intermediate frequency circuit 2 and the gate circuit 3.

In the case where a character multiplex broadcasting signal having a relatively large low frequency region group delay amount is received, i.e. a character broadcasting channel having the group delay characteristic of the transmission path at the point A of a lagged phase characteristic as shown as (B) in FIG. 3 is received, in such a situation, the positive peak level of the framing code signal becomes high, as shown as (A) to (D) in FIG. 7. In addition, the larger the group delay amount the higher the peak level. Accordingly, the capacitor 162 of the peak detecting circuit 16 is charged through the diode 161 and the peak level of the framing code signal is maintained. More specifically, the output of the peak detecting circuit 16 becomes the high level (see (A) in FIG. 11). As a result, one input terminal of the comparator 171 is supplied with a voltage higher than the reference voltage and the output of the comparator 171 becomes the high level (see (B) in FIG. 11). Furthermore, since the output of the comparator 171 becomes the high level, the capacitor 174 is charged (see (C) in FIG. 11) and the output of the comparator 176 at the succeeding stage also becomes the high level, (see (D) in FIG. 11). Therefore, the flip-flop 18 is reversed by the output pulse (see (E) in FIG. 11) of the low frequency oscillator 181 and the $\bar{Q}$ output thereof (see (F) in FIG. 11) becomes the low level. As a result, the relay driver circuit 18 drives the coil 141 of the relay 14, whereby the contact 142 of the relay 14 is turned to the output side of the group delay correcting circuit 15. Accordingly, the group delay correcting circuit 15 comes to be connected between the video intermediate frequency circuit 2 and the gate circuit 3.

When the group delay correcting circuit 15 is thus connected, the low frequency region group delay characteristic of the transmission path at the point B with respect to the above described character broadcasting channel becomes flat or sufficiently easy. Therefore, waveform distortion of the framing code is corrected and the positive peak level becomes low. As a result, the output of the peak detecting circuit 16 becomes the low level and accordingly the respective outputs of the comparators 171 and 178 also become the low level. Accordingly, the flip-flop is thereafter maintained in a reset state and the contact 142 of the relay 14 maintains the previously described state. Therefore, the sampling operation of the framing code signal and data signal is thereafter continually performed with accuracy.

In the case where a character broadcasting channel exhibiting the low frequency region group delay characteristic of the transmission path at the point A being as shown as (A) in FIG. 3 comes to be received from the previously described reception state, then the contact of the relay 14 is turned to a state as shown in FIG. 9 and the group delay correcting circuit 15 comes to be separated from between video intermediate frequency circuit 2 and the gate circuit 3.

Although description was made in the foregoing of a case where the peak level change of the framing code signal is detected, a data signal is also obtained from the gate circuit 3 flowing from the the framing code signal and the data signal as well as the framing code signal undergoes waveform distortion due to the low frequency region group delay characteristic of the transmission path and therefore the change of the peak level of the data signal is also simultaneously detected.

As described in the foregoing, according to the embodiment shown, the change of the peak level due to the low frequency region group delay characteristic of the transmission path of the framing code signal is detected, whereupon the group delay characteristic of in the receiver is switched, whereby the above described waveform distortion is corrected. Therefore, the framing code signal and the data signal can be always detected with accuracy and with certainty.

Figure 2:
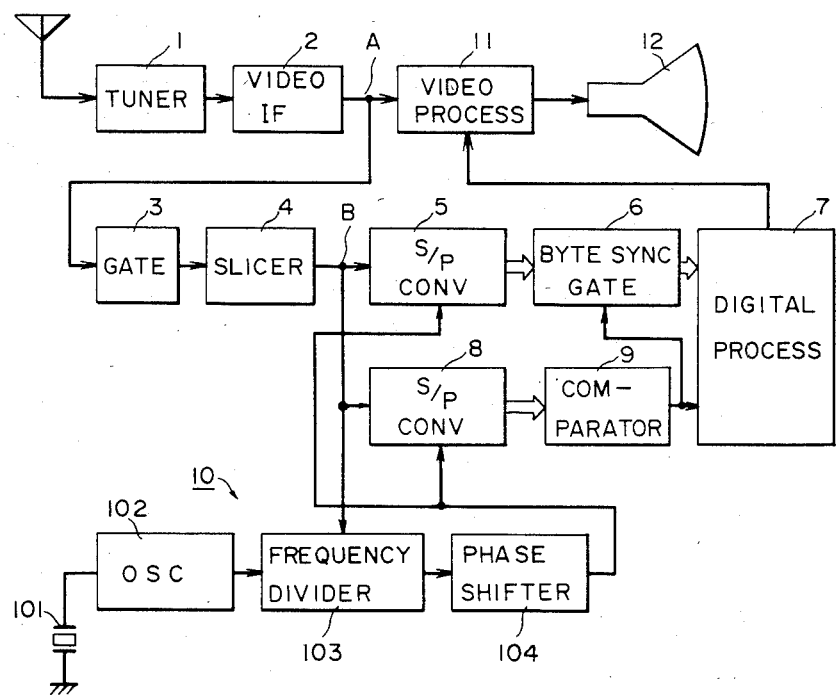
FIG. 2 is a block diagram showing a conventional digital signal receiver for receiving a character multiplex broadcasting signal.
Figure 12:
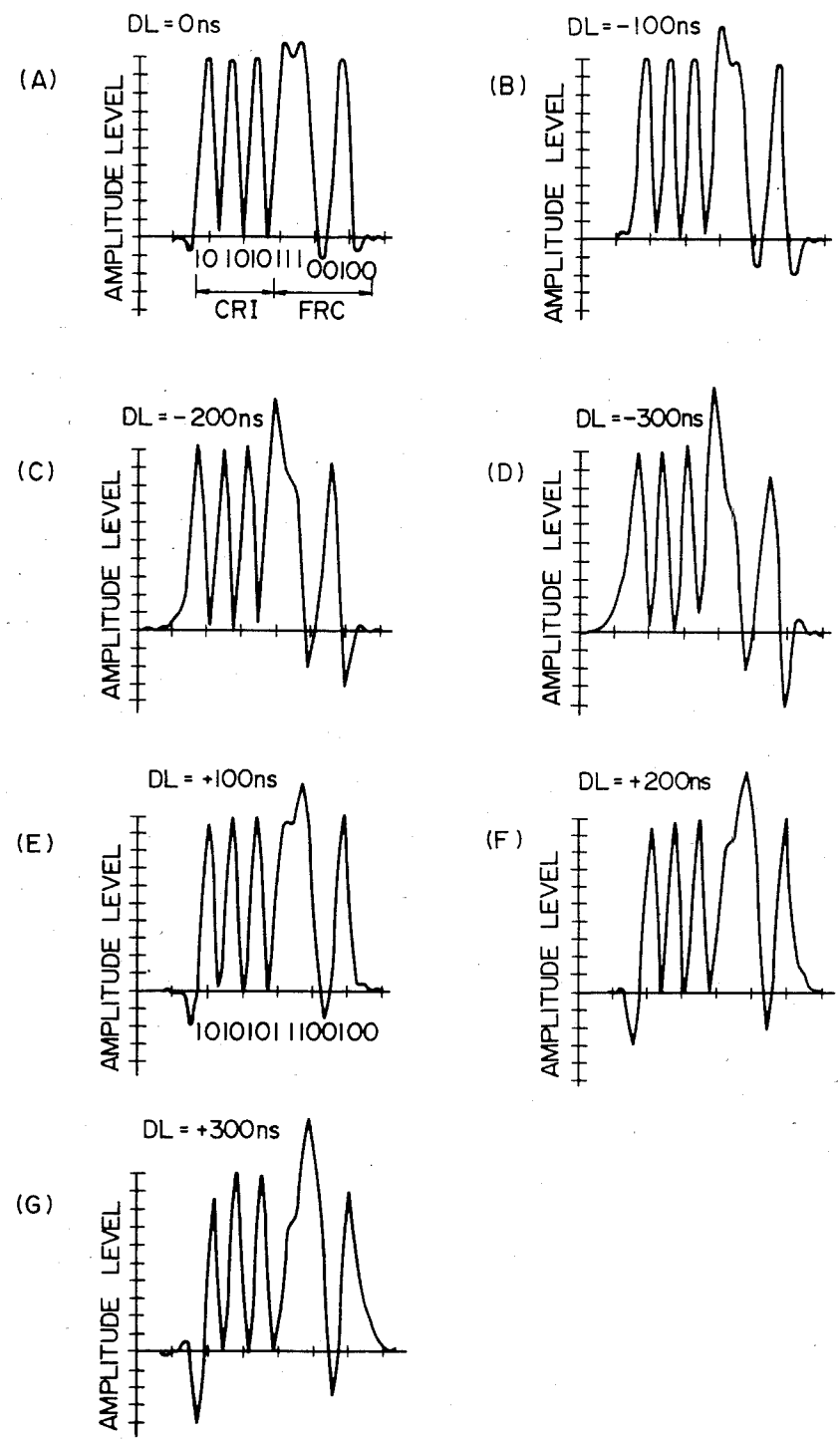
FIG. 12 is a graph showing the waveforms of the clock run-in signal and the framing code signal detected in the digital signal receiver.
Figure 13:
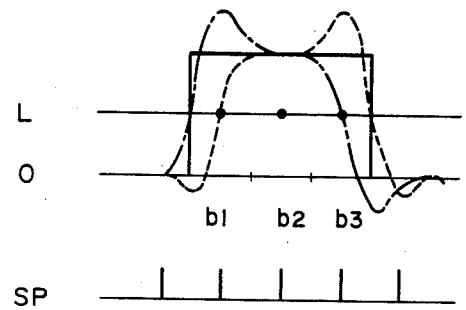
FIG. 13 is a graph showing the relation between the framing code signal and the sampling clock signal.
Figure 15:
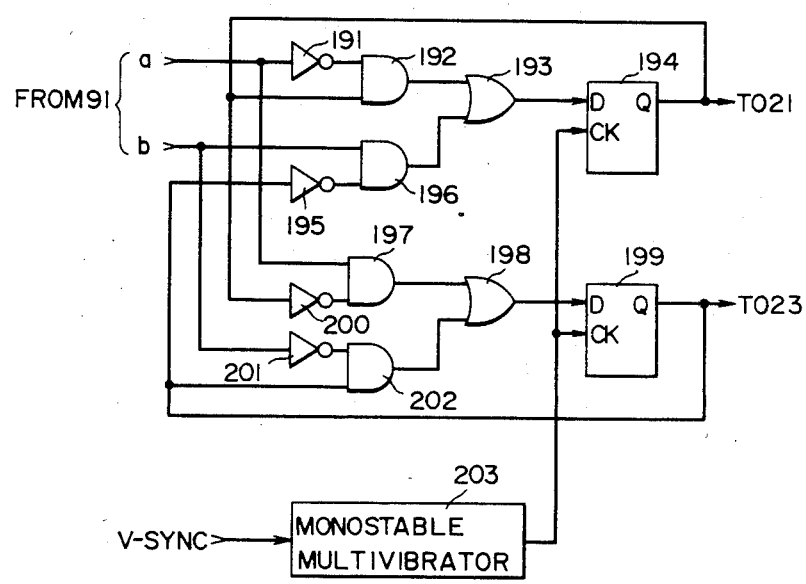
FIG. 15 is a block diagram showing in more detail the logic circuit shown in FIG. 14.
Figure 14:
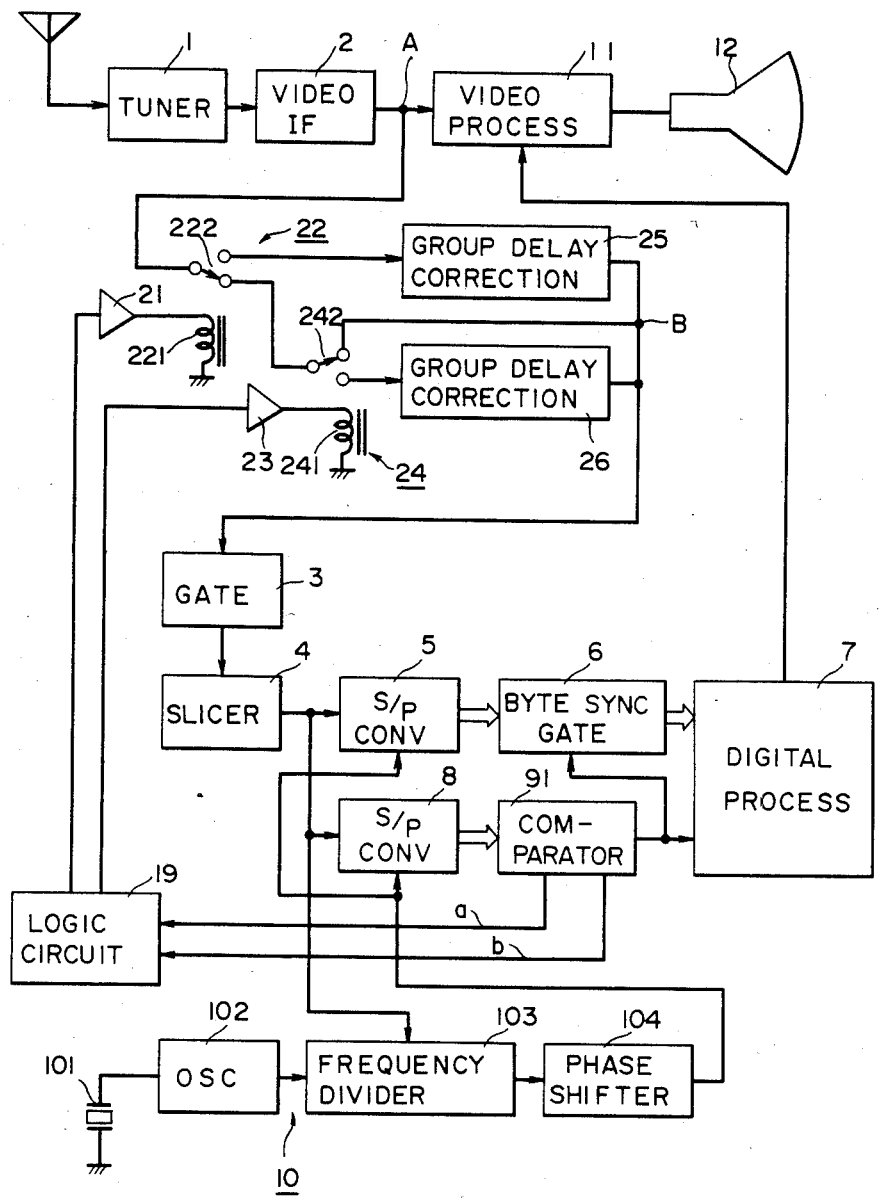
FIG. 14 is a block diagram of a further embodiment of the present invention.

FIG. 12 is a graph showing waveforms of the clock run-in signal and the framing code signal obtained from the gate circuit 3 shown in FIG. 2 in the case where the low frequency region group delay amount shown in FIG. 3 is changed with respect to the character multiplex signal of the previously described NHK-C55 system (FRC: 11100101) and FIG. 13 is a graph showning the relation between the high level period continuing at the first 3 bits of the framing code signal and the sampling clock signal. FIG. 14 is a block diagram showing another embodiment of the present invention and FIG. 15 is a specific block diagram of the logic circuit 19 shown in FIG. 14.

The embodiment shown in FIGS. 12 to 15 is adapted to detect a bit error of the framing code signal, thereby to determine whether the low frequency region group delay characteristic of the transmission path is of an advanced phase or a lagged phase, whereby the group delay correcting circuit 26 for a lagged phase or the group delay correcting circuit 25 for an advanced phase is selected responsive to the determining output signal so that the same may be inserted between the video intermediate frequency circuit 2 and the gate circuit 3.

More specifically, in the case where the low frequencyregion group delay amount is increased in the negative direction (advanced phase) as shown as (A) to (D) in FIG. 12, waveform distortion at the final bit (the third bit) in the high level period continuing at the beginning portion of the framing code signal increases. Conversely, in the case where the low frequency region group delay amount is increased in the positive direction (lagged phase) as shown as (E) to (G) in FIG. 12, waveform distortion at the first bit of the above described beginning portion increases. After the framing code signal is sliced by the slicer circuit 4 shown in FIG. 2, the same is sampled by the serial/parallel converting circuit 5. The relation between the previously described beginning portion of the framing code signal, the slice level (L) and the sampling pulse (SP) is shown in FIG. 13. More specifically, referring to FIG. 13, the dotted line represents a case where the low frequency region group delay amount (DL) is positive (lagged phase), one dotted line represents a case where the low frequency region group delay amount (DL) is negative (advanced phase) and three large dots each represent a sampling point. Accordingly, as seen from FIG. 13, in the case where the low frequency region group delay amount (DL) is positive, the first bit of the beginning portion of the framing code signal is not correctly detected. Conversely, in the case where the low frequency region group delay amount (DL) is negative, the third bit of the beginning portion is not correctly detected, a bit error thus occurs. This is true with a data signal including a low frequency region component lower than 2 MHz just as in the case of the framing code signal. Therefore, the embodiment shown is adapted to determine whether the group delay characteristic of the transmission path is of an advanced phase or a lagged phase by detecting the first and third bits of the beginning portion of the framing code signal.

To that end, the embodiment employs first and second group delay correcting circuits 25 and 26 each constituting an LC circuit, and a contact 222 of a relay 22 and a contact 242 of a relay 24 provided between the video intermediate frequency circuit 2 and the gate circuit 3 to be selectively connected. The above described first and second group delay correcting circuits 25 and 26 are provided for the purpose of correcting the low frequency region group delay characteristic of the transmission path shown in FIG. 3. The first group delay correcting circuit 25 is selected to exhibit an opposite characteristic to that of (B) in FIG. 3, i.e. a characteristic symmetrical to that of (B) in FIG. 3 with respect to the abscissa (advanced phase characteristic) and the second group delay correcting circuit 26 is selected to exhibit an opposite characteristic to that of (C) in FIG. 3 (lagged phase characteristic). Meanwhile, in designing the respective specific characteristics of the first and second group delay correcting circuits 25 and 26, the low frequency region group delay characteristic of the transmission path of the respective character broadcasting channels are taken into consideration and preferably an average or representative characteristic thereof should be selected.

On the other hand, the comparator 91 for detecting the framing code signal is structured as a circuit for comparing the framing code signal obtained from the serial/parallel converting circuit 8 with the first and third bits of the framing code signal stored in advance in a proper memory, whereupon coincidence is detected. In the case where the low frequency region group delay characteristic of the transmission path is of a lagged phase and no coincidence is detected at the first bit of the framing code signal, an error pulse a is obtained, whereas in the case where the low frequency region group delay characteristic of the transmission path is of an advanced phase and no coincidence is detected at the third bit of the framing code signal, an error pulse b is obtained. These error pulses a and b are applied to the logic circuit 19.

The logic circuit 19 comprises inverters 191, 195, 200 and 201, AND gates 192, 196, 197 and 202, OR gates 193 and 198, D-type flip-flops 194 and 199 and a monostable multivibrator 203, connected as shown in FIG. 15. The monostable multivibrator 203 is responsive to the vertical synchronizing signal to provide a timing signal immediately after or immediately before the vertical blanking period and the above described timing signal is applied as a clock signal to the D-type flip-flops 194 and 199. One D-type flip-flop 194 is adapted to be set responsive to the previous state of the relay 22 when the error pulse a is applied to the logic circuit 19 and the Q output thereof is applied through the relay driver circuit 21, thereby to drive the coil 221 of the relay 22. The other D-type flip-flop 199 is set responsive to the previous state of the relay 24 when the error pulse b is applied to the logic circuit 19, whereby the Q output drives the coil 241 of the relay 24 through the relay driver circuit 23.

Now referring to FIGS. 12 to 15, an operation of the embodiment shown will be described. In the case where the low frequency region group delay characteristic of the transmission path at the point A of a character broadcasting channel as received is of a lagged phase as shown as (B) in FIG. 3, the framing code signal obtained from the gate circuit 3 is as shown by the dotted line in FIG. 13, in which case the first bit which must be the logic one will be erroneously sampled as the logic zero. Therefore, the comparator 91 determines the first bit of the framing code signal as non-coincidence, thereby to provide an error detected pulse a of the high level. At that time, the error pulse b is the low level. Then the error pulse a of the high level is inverted by the inverter 191 and disables the AND gate 192. The error pulse a of the high level is also applied to one input of the AND gate 197. The other input of the AND gate 197 is supplied with an inversion by the inverter 200 of the output signal of the low level obtained from the D-type flop-flop 194. Accordingly, the AND gate 197 is enabled and the high level signal is applied through the OR gate 198 to the D-type flip-flop 199. Then the vertical synchronizing signal is applied to the monostable multivibrator 203 and the output of the monostable multivibrator 203 is applied as a clock signal to the D-type flip-flop 199. As a result, the D-type flip-flop 199 is set and the high level signal obtained from the Q output terminal thereof is applied to the relay driver circuit 23. The relay driver circuit 23 drives the coil 241 of the relay 24, thereby to turn the switch 242.

On the other hand, since the error pulse b is the low level, the AND gate 196 is disabled. Furthermore, since the AND gate 192 is also disabled as described previously, the D-type flip-flop 194 is not set. Accordingly, the relay driver circuit 21 is not supplied with the high level signal and the contact 222 of the relay 22 maintains the state. As a result of the above described operation the group delay correcting circuit 25 having the opposite characteristic to that of (B) in FIG. 3, i.e. the advanced phase characteristic is inserted between the video intermediate frequency circuit 2 and the gate circuit 3, whereby the low frequency region group delay characteristic at the point B in FIG. 14 is made flat. As a result, the waveform distortion of the framing code signal and the data signal is corrected. Therefore, sampling of the framing code signal and the data signal is normally performed.

In the case where the low frequency region group delay characteristic of the transmission path at the point A of the character broadcasting channel as received exhibits a negative characteristic as shown as (C) in FIG. 3, i.e. an advanced phase characteristic, the framing code signal obtained from the gate circuit 3 is as shown by the one dotted line in FIG. 13, in which the third bit is erroneously sampled. Therefore, the comparator 91 brings the error pulse a to the low level and the error pulse b to the high level. In such a case, conversely to the foregoing description, the D-type flip-flop 194 is set and the D-type flip-flop 199 is reset. Therefore, the contact of the relay 22 is turned to the input side of the first group delay correcting circuit 25 and the contact 242 of the relay 24 is turned to the output side of the group delay correcting circuit 25. Since the group delay correcting circuit 25 has a lagged phase characteristic, the low frequency region group delay characteristic at the point B is made flat. Therefore, sampling of the framing code signal and the data signal are normally performed.

Meanwhile, since the respective characteristics of the first and second group delay correcting circuits 25 and 26 are primarily determined, in the case where a number of character broadcasting channels having different low frequency region group delay characteristics of the transmission path are available, it is impossible to make complete correction for each of the character broadcasting channels; however, the above described waveform distortion can be improved to some extent for each of the channels.

Figure 17:
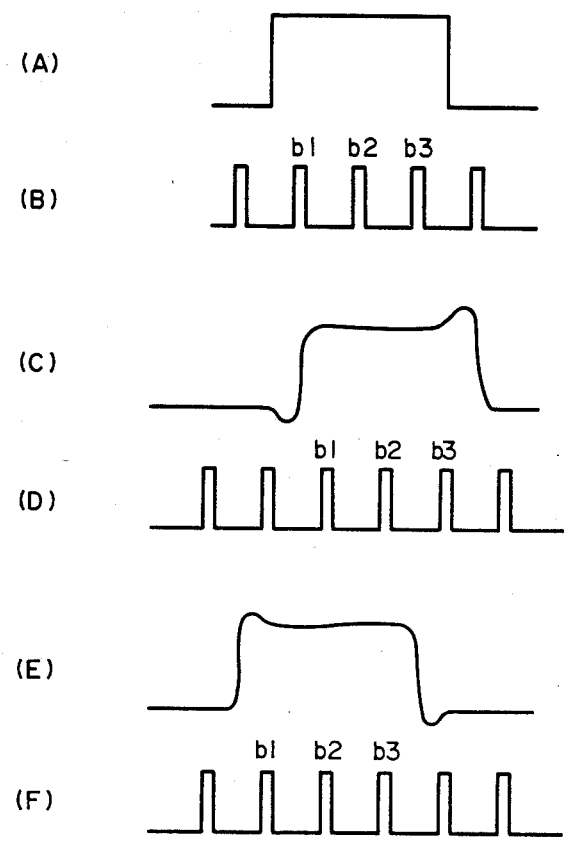
FIG. 17 is a graph showing the relation between the framing code signal and the sampling clock signal.

FIG. 16 is a block diagram of another embodiment of the present invention and FIG. 17 is a graph showing the relation between the high level period continuing at the first 3 bits of the framing code signal and the sampling clock signal.

In view of the fact that in the case where the group delay characteristic of the transmission path is positive, i.e. is of a lagged phase the phases of the framing code signal and the data signal are slightly delayed as shown as (C) in FIG. 17, the FIG. 16 embodiment is structured such that the phase of the sampling clock signal may also be delayed by the same amount as the delay amount of the framing code signal and the data signal. To that end, a correcting circuit 27 such as an LC circuit for delaying the sampling clock signal and a contact 142 of a relay 14 for selecting the correcting circuit 27 are corrected between the phase shifting circuit 104 and the serial/parallel converting circuits 5 and 8. The coil 141 of the relay 14 is driven by the error detecting circuit 13 shown in FIG. 3.

Now in the case where the framing code signal is normally detected without undergoing phase distortion, i.e. in a reception state of the channel of the low frequency region group delay characteristic of the transmission path at the point A being as (A) in FIG. 3, the framing code detected pulses are obtained one by one upon each detection of the framing code signal from the comparator 9. The error detecting circuit 13 receives the framing code detected pulse to drive the relay 14, so that the contact thereof 142 is turned to the input side of the correcting circuit 27. Accordingly, in such a case the sampling clock signal is not corrected.

However, in a reception state of the channel having the low frequency region group delay characteristic of the transmission path at the point A being as shown as (B) in FIG. 3, the framing code detected pulses are not obtained from the comparator 9. Then the framing code detecting circuit 13 does not drive the coil 141 of the relay 14 and the contact 142 thereof is turned to the output side of the correcting circuit 27. Therefore, the correcting circuit 27 is inserted between the phase shifting circuit 104 and the serial/parallel converting circuits 5 and 8. Accordingly, the phase of the sampling clock signal obtained from the correcting circuit 27 is delayed to become consistent with the sampling timing of the framing code signal and the data signal and accordingly sampling of the framing code signal and the data signal is properly performed. More specifically, the phase of the sampling clock signal is made consistent with sampling point of the framing code signal and the data signal in accordance with the group delay characteristic of the transmission path, whereby the sampling can be correctly performed.

Figure 18:
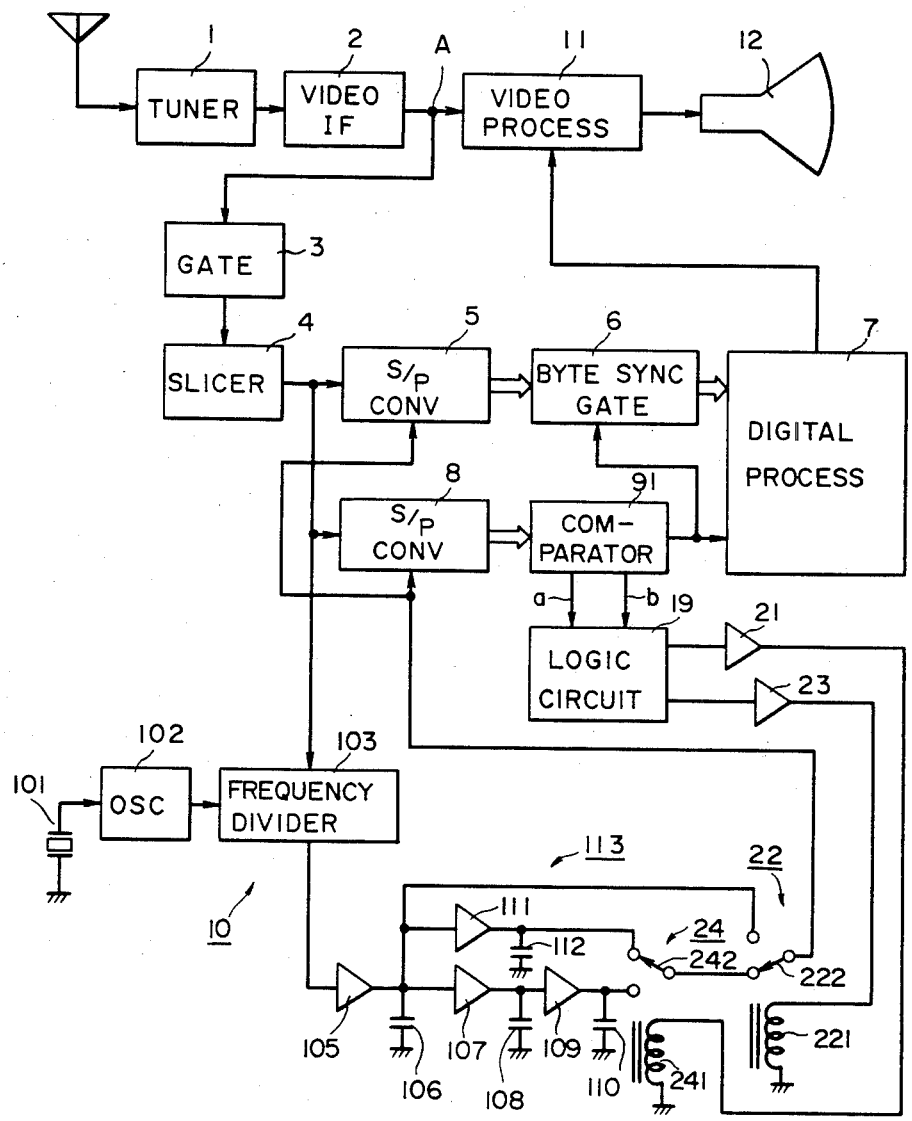
FIG. 18 is a block diagram of still a further embodiment of the present invention.

FIG. 18 is a block diagram of a further embodiment of the present invention. The FIG. 18 embodiment is adapted such that in the case where the group delay characteristic of the transmission path is of an advanced phase the sampling clock signal is also advanced and in the case where the group delay characteristic of the transmission path is of a lagged phase the sampling clock signal is also lagged, whereby the sampling clock signal is made consistent with the sampling timing of the framing code signal and the data signal. More specifically, a phase shifting circuit 113 that is capable of changing the phase of the sampling clock signal is provided in place of the phase shifting circuit 104 shown in FIG. 4. The phase shifting circuit 113 is provided for lagging or advancing the phase of the sampling clock signal obtained from the frequency dividing circuit 103 by a predetermined time period. The phase shifting circuit 113 is capable of selecting any one of three delay amounts depending on the low frequency region group delay characteristic of the transmission path being any one of (A) to (C) in FIG. 3. More specifically, the phase shifting circuit 113 comprises a first path including buffer circuits 105 and 111, capacitors 106 and 112 connected to the output terminals thereof, a second path including buffer circuits 105, 107 and 109 and capacitors 106, 108 and 110 connected to these output terminals, and a third path including a buffer circuit 105 and a capacitor 106.

The first path is selected in the case where the low frequency region group delay characteristic of the transmission path is flat as shown as (A) in FIG. 3, and the second path is selected for the purpose of delaying the sampling clock signal in the case where the low frequency region group delay characteristic of the transmission path is as shown as (B) in FIG. 3, i.e. of a lagged phase. The third path is selected for advancing the sampling clock signal in the case where the low frequency region group delay characteristic of the transmission path is as shown as (C) in FIG. 3, i.e. of an advanced phase. Meanwhile, the respective delay amounts by the first to third paths are preferably selected to an average or representative characteristics of the transmission path in consideration of the low frequency region group delay characteristics of the respective character broadcasting channels.

On the other hand, the comparator 91 employs the same circuit as shown in FIG. 14 and the logic circuit 19 also may be the same as that shown in FIG. 15. The logic circuit 19 serves to drive the coil 241 of the relay 24 through the relay driver circuit 21 in the case where the low frequency region group delay characteristic of the transmission path is of a lagged phase and to drive the coil 221 of the relay 22 through the relay driver circuit 23 in the case where the low frequency region group delay characteristic of the transmission path is of an advanced phase.

Now referring to FIGS. 17 and 18, an operation of the embodiment will be described. In the case where the low frequency region group delay characteristic of the transmission path is flat as shown as (A) in FIG. 3, the comparator 91 does not provide any error pulses a and b. Therefore, the contact 222 of the relay 22 is connected to the relay 24 and the contact 242 of the relay 24 is connected to the first path, i.e. to the output signal of the buffer circuit 111. More specifically, in this case the sampling clock signal shown as (B) in FIG. 17 can sufficiently sample the high level period of the first three bits of the framing code signal as clearly shown as (A) in FIG. 17.

In the case where the low frequency region group delay characteristic of the transmission path is of a lagged phase as shown as (B) in FIG. 3, the comparator 91 determines that an error occurs in the first bit of the framing code signal as shown in FIG. 13, thereby to provide an error pulse a. Accordingly, the logic circuit 19 provides the high level signal to the relay driver circuit 21. The relay driver circuit 21 drives the coil 241 of the relay 24, whereby the contact 242 of the relay 24 is turned to the second path, i.e. to the output side of the buffer circuit 109. As a result, the phase of the sampling clock signal is delayed. More specifically, in the case where the phase of the framing code signal is delayed as shown as (C) in FIG. 17, the sampling clock signal is also delayed as shown as (D) in FIG. 17. Conversely, in the case where the low frequency region group delay characteristic of the transmission path is of an advanced phase as shown as (C) in FIG. 3, the comparator 91 determines that an error occurs in the third bit of the framing code signal, thereby to provide an error pulse b. Accordingly, the logic circuit 19 provides the high level signal to the delay driver circuit 23. The relay driver circuit 23 drives the coil 221 of the relay 22, whereby the contact 222 thereof is turned to the third path, i.e. to the output side of the buffer circuit 105. More specifically, in the case where the phase of the framing code signal is advanced as shown as (E) in FIG. 17, the sampling clock signal is also advanced as shown as (F) in FIG. 17.

Since the sampling clock signal can be delayed or advanced depending on whether the low frequency region group delay characteristic of the transmission path is of a lagged phase or an advanced phase, the phase of the sampling clock signal can be made consistent with the sampling timing of the framing code signal and the framing code signal can be correctly detected even if phase distortion occurs in the framing code signal due to the low frequency region group delay characteristic of the transmission path. Meanwhile, since the embodiment shown operates in the same manner even if the phase distortion occurs not only in the framing code signal but also in the data signal, any malfunction caused by incorrect detection of the framing code signal and data error caused by incorrect sampling of the data signal are prevented from occurring on the occasion of the data signal.

Figure 19:
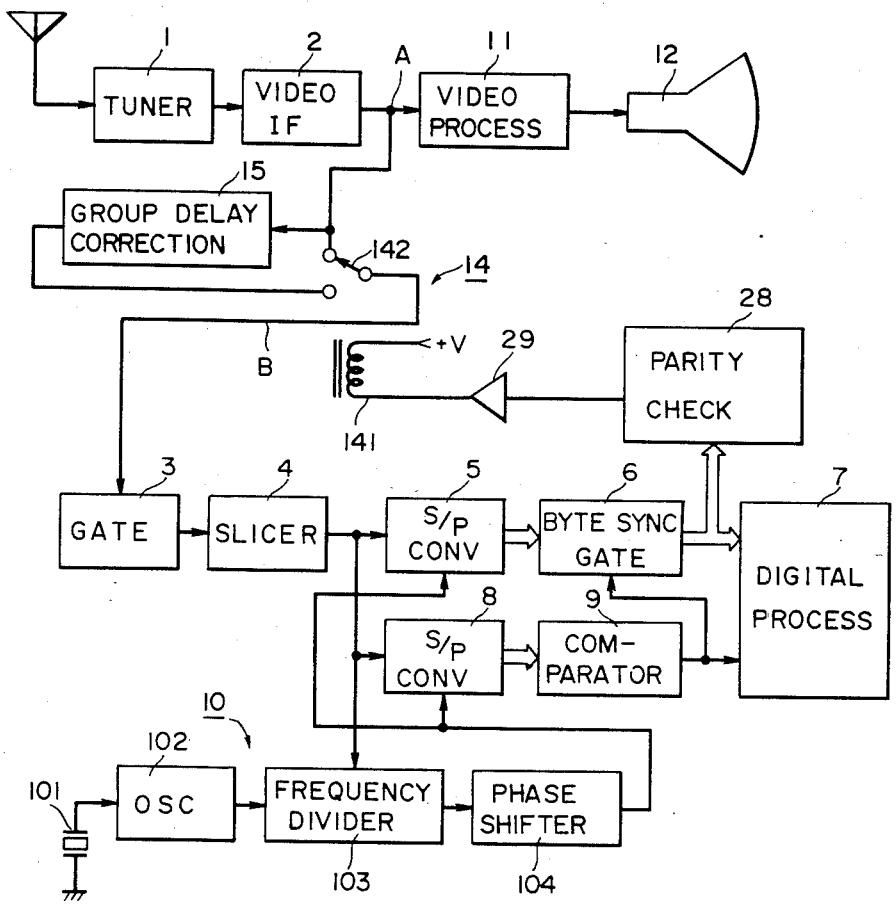
FIG. 19 is a block diagram showing still a further embodiment of the present invention.

FIG. 19 is a block diagram showing a further embodiment of the present invention. The FIG. 19 embodiment is structured such that the data signal is subjected to a parity check and in the presence of an error in the data signal the group delay correcting circuit 15 is inserted between the video intermediate frequency circuit 2 and the gate circuit 3. More specifically, the data signal as byte synchronized by means of the byte synchronizing gate circuit 6 is applied to the parity check circuit 28. As well-known, the parity check circuit 28 serves to determine whether an error has occurred in the data signal. On the other hand, between the video intermediate frequency circuit 2 and the gate circuit 3 are provided the group delay correcting circuit 15 and the relay 14 for correcting the same as described previously. The parity check circuit 28 determines whether an error has occurred in the data signal obtained from the byte synchronizing gate circuit 6 and if an error has occurred the coil 141 of the relay 14 is driven by the relay driver circuit 29. As a result, the contact 142 of the relay 14 is turned to the output side of the group delay correcting circuit 15 and the group delay characteristic is made flat as shown as (B) in FIG. 3.

Thus the data can be also properly reproduced by correcting the low frequency region group delay characteristic of the transmission path by detecting whether an error caused by the low frequency region group delay characteristic of the transmission path has occurred in the data signal by making parity check of the data signal.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital signal receiver for receiving a transmitted digital signal including a data signal including a bit serial type of data and a reference clock signal and a specified code signal preceding said data signal, comprising:
    (a) demodulating means for receiving and demodulating said digital signal being transmitted;
    (b) slicer means for slicing at a predetermined level the digital signal demodulated by said demodulating means;

(c) sampling clock signal generating means for generating a sampling clock signal which is produced in synchronization with said reference clock signal included in an output signal from said slicer means;

(d) serial/parallel converting means for sampling said output signal from said slicer means with said sampling clock signal for reproducing said data signal and said specified code signal, and converting the bit serial type of data in said data signal to a bit parallel type of data;

(e) detecting means for detecting an error in at least one of the specified code or the bit parallel type of data in an output from said serial/parallel converting means, so that non-coincidence of a bit phase is detected between said sampling clock signal and the data signal included in said slicer output signal caused due to a group delay characteristics of a transmission path including a path from transmitter to said demodulating stage;

(f) group delay characteristic correcting means disposed within a transmission path between said demodulating means and said slicer means for the purpose of correction of non-coincidence of said bit phase, said correcting means being responsive to the error detection output from said error detecting means for flattening the total group delay characteristic of the transmission path, including the correcting means, from a transmitter to an input terminal of said slicer means.

2. A digital signal receiver in accordance with claim 1 wherein
said error detecting means comprises non-coincidence detecting means for detecting non-coincidence of a predetermined code signal and said specified code signal as demodulated.

3. A digital signal receiver in accordance with claim 1, wherein
said error detecting means comprises parity check means for performing a parity check of said data signal as demodulated for detecting whether said data signal involves an error or not.

4. A digital signal receiver in accordance with claim 1, wherein
said error detecting means comprises peak value detecting means responsive to a peak value of said digital signal as demodulated for detecting whether an error has been caused by said group delay characteristic.

5. A digital signal receiver in accordance with claim 1, wherein
said correcting means comprises relative level changing means for changing a correlation of the slice level of said slice means and amplitude of said digital signal as demodulated,
said relative level changing means including changing means for changing the amplitude of said digital signal as demodulated.

6. The digital receiver of claim 5, wherein said amplitude changing means comprises a LC circuit.

* * * * *